United States Patent
Bentley

(10) Patent No.: US 7,068,778 B1
(45) Date of Patent: Jun. 27, 2006

(54) INTEGRATED LINE INDUCTOR AND LINE FEED RESISTOR

(75) Inventor: Ronald Locker Bentley, Santa Rosa, CA (US)

(73) Assignee: Alcatel, Paris (FR)

( * ) Notice: Subject to any disclaimer, the term of this patent is extended or adjusted under 35 U.S.C. 154(b) by 380 days.

(21) Appl. No.: 10/337,457

(22) Filed: Jan. 7, 2003

(51) Int. Cl.
*H04M 1/00* (2006.01)

(52) U.S. Cl. .................. 379/399.01; 379/402; 379/413

(58) Field of Classification Search .......... 379/399.01, 379/402, 413
See application file for complete search history.

(56) References Cited

U.S. PATENT DOCUMENTS

| 4,613,841 A | 9/1986 | Roberts ................... 336/65 |
| 4,912,447 A | 3/1990 | Paul ........................ 336/69 |
| 5,559,486 A | 9/1996 | Ikenoue et al. ............ 336/90 |
| 6,842,518 B1 * | 1/2005 | Chen et al. ................ 379/398 |

* cited by examiner

*Primary Examiner*—Jefferey P. Harold
(74) *Attorney, Agent, or Firm*—Danamraj & Youst, PC; Bobby D. Slaton; V. Lawrence Sewell

(57) ABSTRACT

An integrated line inductor and line feed resistor is disclosed. A first coil winding and a second coil winding having a select resistance are magnetically coupled to each other. The first coil winding and second coil winding are each operable to transform electric energy between a Subscriber Line Interface Circuit (SLIC) and a tip and ring (T/R) line.

12 Claims, 2 Drawing Sheets

INTEGRATED LINE INDUCTOR AND LINE FEED RESISTOR

BACKGROUND OF THE INVENTION

1. Technical Field of the Invention

The present invention generally relates to telecommunications network equipment. More particularly, and not by way of any limitation, the present invention is directed to an integrated line inductor and line feed resistor arrangement used in network equipment.

2. Description of Related Art

Subscriber Line Interface Circuits (SLICs) are employed to provide an interface between a low voltage signal path in a telephone central office (CO) and a high voltage telephone subscriber line. The SLIC provides functions such as off hook detection, ringing signaling generation and battery feed to the subscriber line. The subscriber line consists of a telephone transmission line, including two conductors referred to as A and B or tip and ring (T/R); and the subscriber telephone equipment coupled across the tip and ring conductors. The subscriber line and the subscriber telephone equipment are also referred to as a subscriber loop.

The SLIC provides power from the telephone CO, or a remote office, to the subscriber line in response to a received battery voltage. The battery voltage is a DC voltage supplied to the SLIC to power the SLIC and the subscriber line. The battery voltage has a value generally in the range of –20 to –60 VDC. A typical value of the battery voltage can be about –48 VDC. The SLIC supplies a DC current at an operating DC voltage to the subscriber line in order to source power to the telephone circuitry such as a digital keypad. Superimposed on the DC current are AC signals of audio frequency by which information is conveyed between the subscriber and the CO. The battery voltage source is generated at the CO by a depletable energy source device such as a battery or by a DC generator.

In Digital Subscriber Line (DSL) applications provided to subscribers by Competitive Local Exchange Carriers (CLECs) or local telephone companies, each SLIC is coupled to the T/R line by a ceramic film resistor and line inductor which provide line feed resistance and low pass filtration, respectively. FIG. 1 (Prior Art) depicts an existing line inductor and line feed resistor arrangement 100 coupled to a Subscriber Line Interface Circuit (SLIC) and tip and ring (T/R) line. SLIC 102 is coupled to a pair of ceramic film resistors 104 and 106. The ceramic film resistors 104 and 106 are able to withstand high temperatures while offering a predetermined resistance, typically around 30 $\Omega$, to current. A pair of line feed inductors 108 and 110 are coupled to the ceramic film resistors 104 and 106 and the T/R line. Whereas the existing arrangements have been employed in various network equipment applications, they are not without limitations, however. The ceramic film resistors are expensive, thereby adding to the overall cost structure of network equipment. Furthermore, matching the resistance of the ceramic resistors and the line feed inductors has proved to be difficult. The ceramic resistors must have a matched resistance within 0.1%. Hence, a need exists for a line inductor and line feed resistor arrangement that provides matched resistance as well as acceptable failure modalities when tested accordingly to certain GR-1089 tests. Additionally, a need exists for such a system and method to be inexpensive and require a minimum amount of board space.

SUMMARY OF THE INVENTION

Accordingly, the present invention advantageously provides a line inductor and line feed resistor arrangement that offers matched resistance at an inexpensive price point while consuming a minimum amount of board space. The line inductor and line feed resistor scheme of the present invention achieves this arrangement by integrating the line feed resistance of the ceramic film resistor and low pass filtration of the line inductor into a single device.

In one aspect, the present invention is directed to an integrated line inductor and line feed resistor that include a first coil winding and a second coil winding that are magnetically coupled to each other, wherein the first and second coil windings have a select resistance. The first and second coil windings are operable to transform electric energy between a Subscriber Line Interface Circuit (SLIC) and a tip and ring (T/R) line. In one implementation, the resistance of the first and second coil windings is between approximately 30 $\Omega$ and approximately 40 $\Omega$.

In one embodiment, the first and second coil windings have a resistance of approximately 35 $\Omega$. The electrical resistivity of the first and second coil windings may be between approximately $10 \times 10^{-6}$ $\Omega$cm and approximately $20 \times 10^{-6}$ $\Omega$cm at 300 K. The coil windings may comprise, but not limited to, tin, tantalum, steel alloys, or nickel manganese alloys.

In another aspect, the present invention is directed to a system for providing line inductance and line feed resistance. The system includes a transformer having a resistance between approximately 30 $\Omega$ and approximately 40 $\Omega$. Additionally, an SLIC and T/R line are electrically coupled to the transformer. In one implementation, the transformer may be a pot core transformer. Further, the SLIC may be associated with a combination xDSL/POTS line circuit and the T/R line may be associated with a subscriber loop.

BRIEF DESCRIPTION OF THE DRAWINGS

The accompanying drawings are incorporated into and form a part of the specification to illustrate the preferred embodiments of the present invention. Various advantages and features of the invention will be understood from the following Detailed Description taken in connection with the appended claims and with reference to the attached drawing figures in which:

DETAILED DESCRIPTION OF THE DRAWINGS

Figure 1:
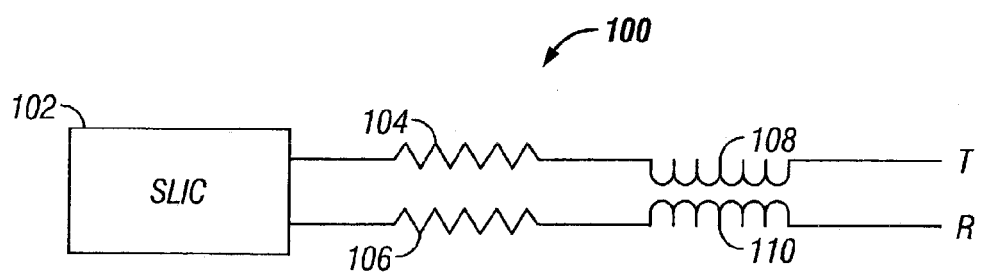
FIG. 1 (Prior Art) depicts an existing line inductor and line feed resistor arrangement coupled to a Subscriber Line Interface Circuit (SLIC) and tip and ring (T/R) line.

Presently preferred embodiments of the invention will now be described with reference to various examples of how the invention can best be made and used. Like reference numerals are used throughout the description and several views of the drawings to indicate like or corresponding parts, wherein the various elements are not necessarily drawn to scale.

Figure 2:
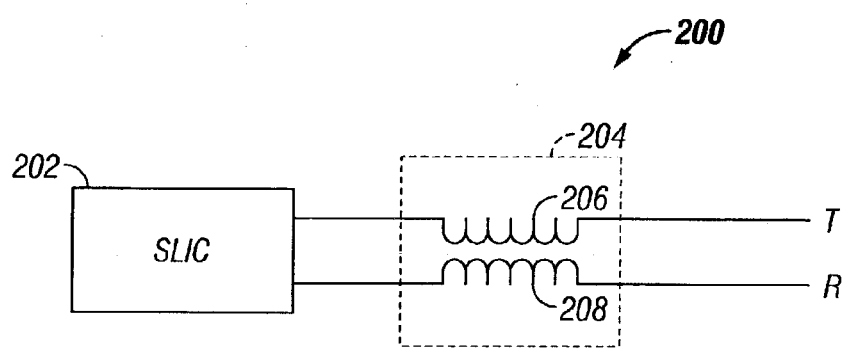
FIG. 2 depicts an exemplary embodiment of the integrated line inductor and line feed resistor arrangement of the present invention coupled to an SLIC and T/R line.

Referring now to the drawings, and more particularly to FIG. 2, there is shown an exemplary subscriber loop arrangement, generally designated reference numeral 200, which incorporates an exemplary preferred embodiment of the present invention. A Subscriber Line Interface Card (SLIC) 202 may be associated with a line card located in a central office (CO) or remote office (RO) that is operable as a combination xDSL/POTS line circuit. An integrated line inductor and line feed resistor 204 interfaces the SLIC 202 with a tip and ring (T/R) line to provide subscribers or customers telephone and data services via a subscriber loop. The T/R line may be a pair of wires, or additional wires may be present to add additional functionality such as external signaling or duplexing.

The integrated line inductor and line feed resistor 204 of the present invention includes coiled windings 206 and 208 that may be magnetically coupled to each other. Each of the coiled windings 206 and 208 have a resistance between approximately 30 $\Omega$ and approximately 40 $\Omega$. In one embodiment, the resistance of the coiled windings 206 and 208 is approximately 35 $\Omega$. As will be discussed in more detail hereinbelow, in one implementation, the magnetically-coupled coiled winding inductors may take the form of a transformer. It should be appreciated, however, that although two coiled windings are depicted, the integrated line inductor and line feed resistor arrangement of the present invention may comprise any number of two coil windings depending on the application.

Figure 3:
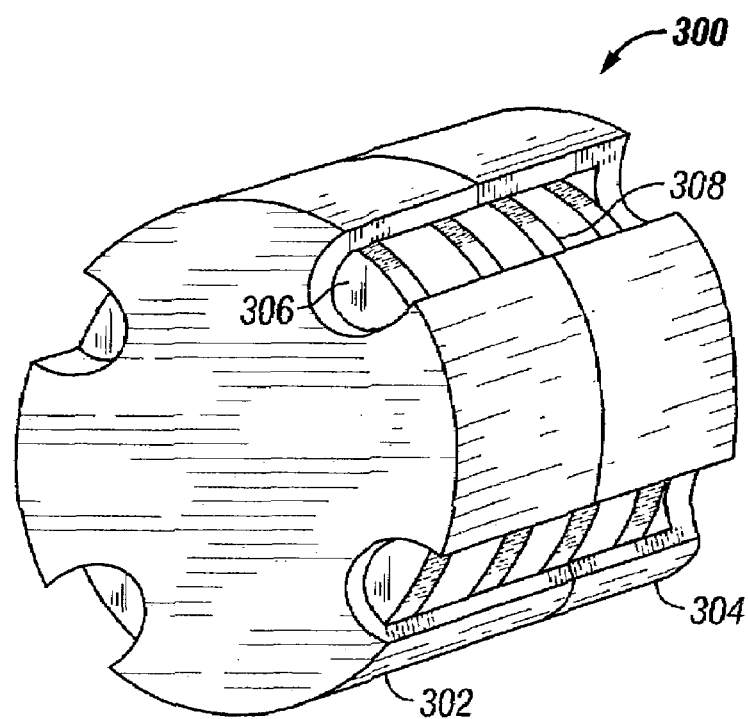
FIG. 3 depicts a perspective view of one embodiment of a pot core transformer employed in accordance with the teachings of the present invention.

FIG. 3 depicts one embodiment of a pot core transformer employed in accordance with the teachings of the present invention. A cylindrically shaped transformer 300 with a ferrite "pot core" is formed of two halves 302 and 304 which enclose a bobbin 306 and associated windings, such as winding 308. In the pot core transformer 300, the two halves 302 and 304 are disposed about the bobbin 306 to form a low-reluctance magnetic path and shield for the windings which provides an ideal integrated line inductor. Even though a pot core transformer is depicted, it should be appreciated that the other types of transformers are within the teachings of the present invention. For example, a U-1 transformer core or E-core design may be employed. Preferably, regardless of the type of transformer design selected, the transformer may be provided with magnetic shielding, if necessary.

The windings of the pot core transformer 300 are selected to provide a resistance between approximately 30 $\Omega$ and approximately 40 $\Omega$. As will be discussed in more detail below, these windings may comprise materials including but not limited to tin, tantalum steel alloys or nickel manganese alloys. By selecting the windings of the transformer 300 to provide a resistance between approximately 30 $\Omega$ and approximately 40 $\Omega$, the transformer of the present invention integrates the line feed resistance of the ceramic film resistor and low pass filtration of the line inductor into a single device.

More particularly, with respect to the line feed resistance functionality of the present invention, Telcordia General Requirements Specification GR-1089 for Electromagnetic Compatibility and Electrical Safety (formerly published by Bellcore) governs the performance of protective devices and design considerations for communications equipment in North America. Since the T/R line very often shares a pole or a common use trench and ground rod with an AC power system, some level of induced current is almost always measurable on the T/R line. Accordingly, GR-1089 requires SLICs to be protected by current-limiting devices, such as a resistor having approximately 35 $\Omega$ of resistence, to prevent the SLICs and other telecommunications equipment from long-duration faults during which joule heating may result in a fire or damage to thermally sensitive components. Hence, the integrated line inductor and line feed resistor of the present invention provides the necessary line feed resistance to satisfy GR-1089. Moreover, the coiled windings of the integrated line inductor and line feed resistor of the present invention inherently provide matched resistence to greater than 0.1% and provide an economical alternative to expensive ceramic resistors.

With respect to the low pass filtration functionality provided by the integrated component arrangement of the present invention, Digital Subscriber Line (DSL) services, including Asymmetric DSL (ADSL), High Bit Rate DSL (HDSL) and Single Pair Symmetrical Services (SDSL), collectively referred to as XDSL services, transmit data between a CO and a subscriber via the existing copper twisted-pair cable plant that carries voice. Transmission of the DSL data occurs in a higher frequency bandwidth portion (generally >28 KHz) of the copper T/R lines and the performance of the transmission is subject to loop length, the presence of bridge taps and cross-coupled interference. Accordingly, to provide high performance DSL transmission, the integrated line inductor and line feed resistor arrangement of the present invention is designed to provide appropriate levels of filtration to the DSL signal transmissions.

Figure 4:
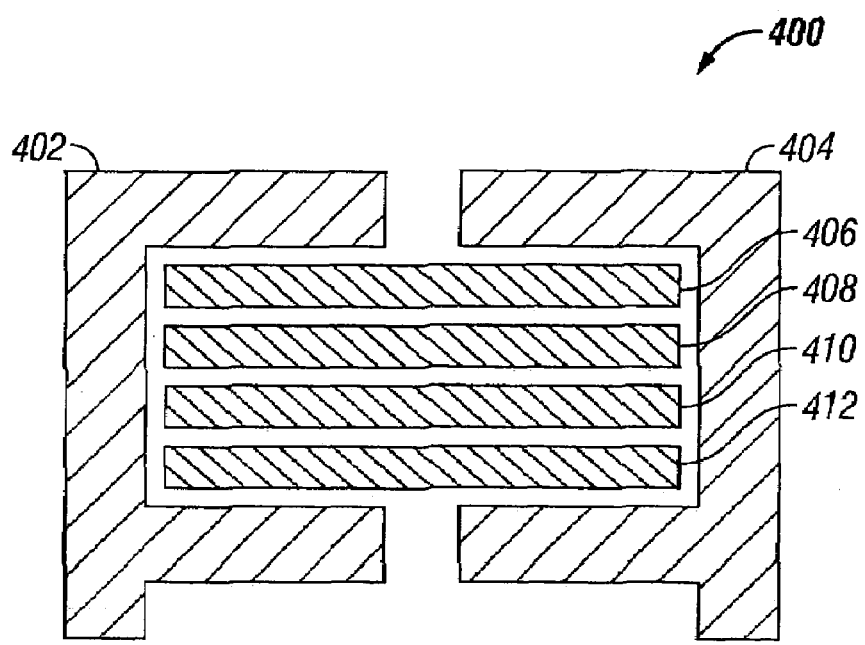
FIG. 4 depicts a cross sectional view of one embodiment of a pot core transformer.

FIG. 4 depicts a cross-sectional view 400 of an exemplary pot core transformer, such as, e.g., the pot core transformer 300 described hereinabove. As previously discussed, however, the integrated line inductor and line feed resistor may take the form of any electrical device which, by electromagnetic induction, transforms electric energy to offer appropriate electrical resistance while providing frequency band separation with respect to one or more other circuits. As illustrated, the cross-sectional pot core transformer 400 includes two halves 402 and 404 as well as four windings 406, 408, 410 and 412. The pot core transformer 400 has a resistance of between approximately 30 $\Omega$ and approximately 40 $\Omega$. This resistance is achieved by selecting coiled windings 406, 408, 410 and 412 of conventional diameter having an electrical resistivity between approximately $10 \times 10^{-6}$ $\Omega$cm and approximately $20 \times 10^{-6}$ $\Omega$cm at 300 K. In one implementation, the material of the coiled windings may comprise an "unconventional" electrical material such as, e.g., tin, tantalum, steel alloys or nickel manganese alloys. The following table, Table 1, summarizes the resistivities of these materials:

TABLE 1

Exemplary materials for coiled windings.

| Material | Resistivity ($10^{-6}$ $\Omega$ cm at 300 K) |
|---|---|
| Tin (Sn) | 11.4 |
| Tantalum (Ta) | 13.1 |
| Steel alloys | 13 to 22 |
| Nickel manganese alloys | 10 to 20 |

In one presently preferred exemplary embodiment, the material selected for the coiled windings 406, 408, 410, and 412 has good soldering and welding qualities. If the material does not have good soldering/welding qualities, however, the material may be plated with a conventional material, such as copper, having good soldering qualities. Moreover, in one exemplary embodiment, the material selected for the coiled windings is windable on a bobbin. Further, it should be appreciated that selection of the core type and construction details would need to be consistent with preserving the failure properties of conventional ceramic resistors (i.e., no burning or fragmentation). For instance, if as a winding opens fragmentation cannot occur because of the mechanical strength of the surrounding core. There would also be a lack of old combustible material at anticipated temperatures within the transformer.

It will be apparent that to those skilled in the art that although only four elements and alloys are listed as materials for the coiled windings, other elements or alloys may also serve as materials for the coiled windings. For example, by modifying the diameter of the material selected for the coiled windings, a material having an electrical resistivity outside the range of approximately $10 \times 10^{-6}$ Ωcm and approximately $20 \times 10^{-6}$ Ωcm at 300 K may be employed that provides the integrated line inductor and line feed resistor with a resistance of between approximately 30 Ω and approximately 40 Ω.

Although the invention has been described with reference to certain exemplary embodiments, it is to be understood that the forms of the invention shown and described are to be treated as presently preferred exemplary embodiments only. Various changes, substitutions and modifications can be realized without departing from the spirit and scope of the invention as defined by the appended claims.

What is claimed is:

1. An integrated line inductor and line feed resistor, comprising:
    a first coil winding having a predetermined resistance, said first coil winding being operable to transform electric energy between a Subscriber Line Interface Circuit (SLIC) and a tip and ring (T/R) line; and
    a second coil winding having a predetermined resistance, said second coil winding being operable to transform electric energy between said SLIC and said T/R line,
    wherein said first coil winding and said second coil winding are magnetically coupled to each other and form a portion of a pot core transformer.

2. The integrated line inductor and line feed resistor as recited in claim 1, wherein at least one of said first coil winding and second coil winding has a resistance between approximately 30 ohms and approximately 40 ohms.

3. The integrated line inductor and line feed resistor as recited in claim 1, wherein said first coil winding and second coil winding have an electrical resistivity between approximately $10 \times 10^{-6}$ S cm and approximately $20 \times 10^{-6}$ S cm at 300 K.

4. The integrated line inductor and line feed resistor as recited in claim 1, wherein at least one of said first coil winding and said second coil winding is selected from the group of materials consisting of tin, tantalum, steel alloys, and nickel manganese alloys.

5. The integrated line inductor and line feed resistor as recited in claim 1, wherein said first coil winding and said second coil winding form a transformer.

6. The integrated line inductor and line feed resistor as recited in claim 1, wherein said SLIC is associated with a line card.

7. The integrated line inductor and line feed resistor as recited in claim 1, wherein said T/R line is associated with a subscriber loop.

8. A system for providing line inductance and line feed resistance in network equipment line card circuitry, comprising:
    a pot core transformer having a predetermined resistance, said transformer for providing integrated line conductance and line feed resistance functionality; and
    a Subscriber Line Interface Circuit (SLIC) electrically coupled to said transformer,
    wherein said transformer is electrically coupled to a tip and ring (T/R) line pair of a subscriber loop serviced by said SLIC.

9. The system as recited in claim 8, wherein said transformer further comprises a first coil winding and a second coil winding have an electrical resistivity between approximately $10 \times 10^{-6}$ S cm and approximately $20 \times 10^{-6}$ S cm at 300 K.

10. The system as recited in claim 8, wherein said transformer further comprises a first coil winding and a second coil winding.

11. The system as recited in claim 10, wherein at least one of said first coil winding and second coil winding is selected from the group of materials consisting of tin, tantalum, steel alloys, and nickel manganese alloys.

12. The system as recited in claim 8, wherein said SLIC is associated with a line card.

* * * * *